Dec. 2, 1969  R. G. WOOLWORTH  3,481,066
FISHING TACKLE BOX

Filed April 22, 1968  3 Sheets-Sheet 1

INVENTOR
RICHARD G. WOOLWORTH

BY *Jacobi & Davidson*

ATTORNEYS.

Dec. 2, 1969    R. G. WOOLWORTH    3,481,066
FISHING TACKLE BOX

Filed April 22, 1968    3 Sheets-Sheet 2

INVENTOR
RICHARD G. WOOLWORTH

BY *Jacobi & Davidson*

ATTORNEYS.

United States Patent Office 3,481,066
Patented Dec. 2, 1969

3,481,066
FISHING TACKLE BOX
Richard G. Woolworth, Lancaster, Pa., assignor to Woodstream Corporation, Lititz, Pa., a corporation of Pennsylvania
Filed Apr. 22, 1968, Ser. No. 722,836
Int. Cl. A01k 97/06
U.S. Cl. 43—57.5                                    7 Claims

ABSTRACT OF THE DISCLOSURE

An improved box for storing and transporting fishing tackle and the like. The tackle box includes a center partition member to which are affixed two similar box halves by hinge means. The box halves close into engagement with the center partition member, thereby providing additional structural support. A handle is attached to the central partition member.

BACKGROUND OF THE INVENTION

This invention relates to an improved box for storing and transporting fishing tackle and the like. More particularly, this invention relates to a box for storing and transporting fishing tackle which is adapted to accommodate a relatively large quantity and variety of tackle in such a manner that the tackle may be selectively removed from the box without exposing all the contents of the box and while the box is stable in an upright position.

Tackle boxes of conventional construction usually comprise a rectangular container fabricated of sheet metal, rigid plastic, or other suitable material which has four upstanding sides, a flat bottom, and an open top. A cover member consisting of a similar rectangular box, although usually smaller, is hinged to one of the upstanding sides of the main box and locked thereto by conventional locking means disposed on the side opposite that to which the hinges are affixed. By these means, the cover member may be disposed in either a closed position or an open position thereby exposing the entire interior of the box. Many conventional tackle boxes also include a compartmented tray supported between the main box and the cover member in such a manner that the tray swings upwardly and outwardly of the bottom box when the cover member is opened, and in turn so that the tray swings into the main box when the cover member is closed. These conventional tackle boxes are quite satisfactory even though they possess certain disadvantages. The most serious of these disadvantages is the fact that most of the contents of the box are placed therein in no particular order and are difficult to retrieve when needed. Further, when the box is opened, it easily becomes unbalanced due to the weight of the cover member and the tray being set off to one side of the main box. Due to this unbalance, the box can easily be upset thereby spilling the contents thereof out and subjecting such equipment to the possibility of loss or damage. Another disadvantage of conventional tackle boxes is presented by the use of such boxes as permanent storage places for various fishing tackle necessitating carrying a large amount of fishing tackle on a particular fishing expedition which is not needed at the time. Alternatively, the unnecessary fishing tackle may be removed and left at home in a loose manner.

Most of the disadvantages associated with conventional tackle boxes were overcome by the device described and claimed in U.S. Patent No. 3,310,905 issued Mar. 28, 1967, to Roger E. Davis and Douglas G. B. Hill, entitled "Fishing Tackle Box," and commonly assigned herewith. That patent describes a fishing tackle box which, in the preferred embodiment, consists of two identical sections having rectangular bottoms, normally extending sides, and open tops. These sections are formed of a double shell plastic construction with a lightweight foam filling the space between the shells. The sections are hinged together on one of the long sides and may, therefore, be disposed in either an open or a closed position. A flat partition member is included which has dimensions similar to, but slightly smaller than, the box sections and which is generally rectangular in shape. The partition member is pivotally mounted so that when the box is in the open position the partition may be pivoted between the box sections so as to gain access to either side.

A series of regularly spaced transversely extending short rails or guides are disposed on the opposed inner surfaces of the long side of each of the sections. Plastic parts boxes and the like are supported on these guides. Due to this feature, individual items may be selectively removed from the tackle box without disturbing the other contents. Also, any of the contents which are not to be taken on a particular fishing expedition may be left at home safely stored in the plastic parts boxes.

A particular advantage of that tackle box is that it requires less floor space than conventional tackle boxes since it rests on the small end of the box rather than on the flat base. Further, the provision of twin boxes both adapted to rest on their short bases at angles to one another provides the unit with more stability than the conventional unit with its larger base.

It has been found, however, that this tackle box when in a fully opened position becomes relatively unstable when used in certain types of environments. For instance, if the tackle box is placed in the bottom of a small boat in the fully opened position, rocking of the boat caused by movement of passengers in the same or by rough water may cause the tackle box to tip over. While this would not necessarily cause disarray among the contents of the box since they are held in compartments or drawers, or are affixed to the partition by rubber bands or the like, a certain amount of confusion can result. Further, it has been found that a certain amount of unbalance results due to the possible placement of heavier items, such as reels and the like, on one side of the tackle box and lighter items on the other. Another related disadvantage of the tackle box of the aforementioned Davis et al. patent resides in the placement of the handle in that tackle box. Each compartment half contains a handle member placed such that when the tackle box is closed, the two separate handle members are juxtaposed to form a single unitary handle. A fisherman using this tackle box will tend to lift it by one of the handle members if the box is in a partially or fully open position thereby placing a great strain on the hinge members connecting the two halves and creating a condition of unbalance leading to the possibility of having some of the parts compartments slip out of the box.

The tackle box of the present invention provides a significant improvement over any of the tackle boxes of the prior art, whether they be conventional tackle boxes or a tackle box as described by Davis et al. Thus, this invention provides a fishing tackle box which includes a center partition member having an essentially planar web portion and a peripheral portion with a large top portion of a somewhat hexagonal configuration to which the handle is attached. Two similar box halves are attached to the center partition by hinge means and close into engagement with the center partition member providing additional support and forming a tight joint seal.

It is thereby a primary object of this invention to provide a fishing tackle box which is free of the aforementioned and other such disadvantages and which includes a center partition member having structural utility to which two substantially identical cover members are hingedly attached.

Another object of this invention is to provide such a fishing tackle box in which a carrying handle is secured to the top of the center member and in which the two cover members can support a plurality of drawers and trays in a stable manner.

A still further object of this invention is to provide a fishing tackle box in which flies, lures, or the like, may be conveniently and safely stored on the center partition member.

Consistent with the foregoing objects, it is yet another important object of this invention to provide a fishing tackle box in which the center member comprises a substantially planar web having longitudinally extending ribs on each face thereof and onto which the cover members close in order to effect a substantially tight joint seal and further support.

Other objects, advantages and applications of this invention will be made apparent by the following detailed description. The description makes reference to a preferred and illustrative embodiment of the invention presented in the accompanying drawings wherein.

DESCRIPTION OF THE PREFERRED EMBODIMENT

Figure 1:
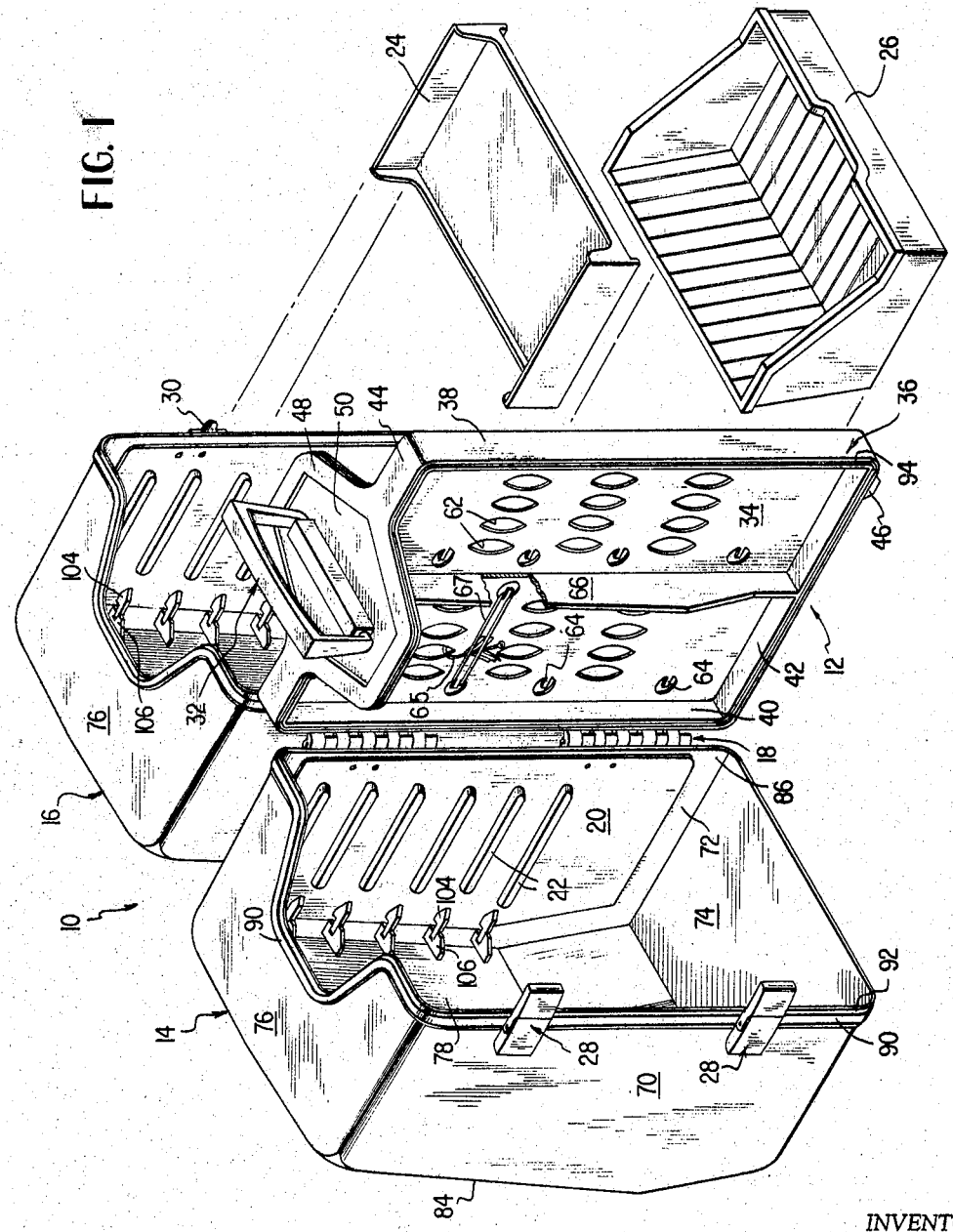
FIGURE 1 is a front perspective view of a fishing tackle box in the open position in accordance with a preferred embodiment of this invention, with a portion broken away for illustrative clarity.

Referring now to FIGURE 1, the fishing tackle box of the preferred embodiment, generally designated by the numeral 10, comprises a central dividing member 12 to which two cover members 14 and 16 are affixed by hinge means 18. On the inner side walls of the cover members 14 and 16 panel members 20 are provided which contain a plurality of transversely extending flat, elongated guides 22 and are adapted to support, guide and/or retain one or more trays 24, drawers 26, conventional lure boxes for lures or small parts (not shown), and the like. Latch means 28 affixed to cover section 14 cooperate with strike plates 30 carried on cover section 16 when the fishing tackle box 10 is in the closed position. Handle means 32 is securely fixed to the top portion of center panel member 12.

Figure 4:
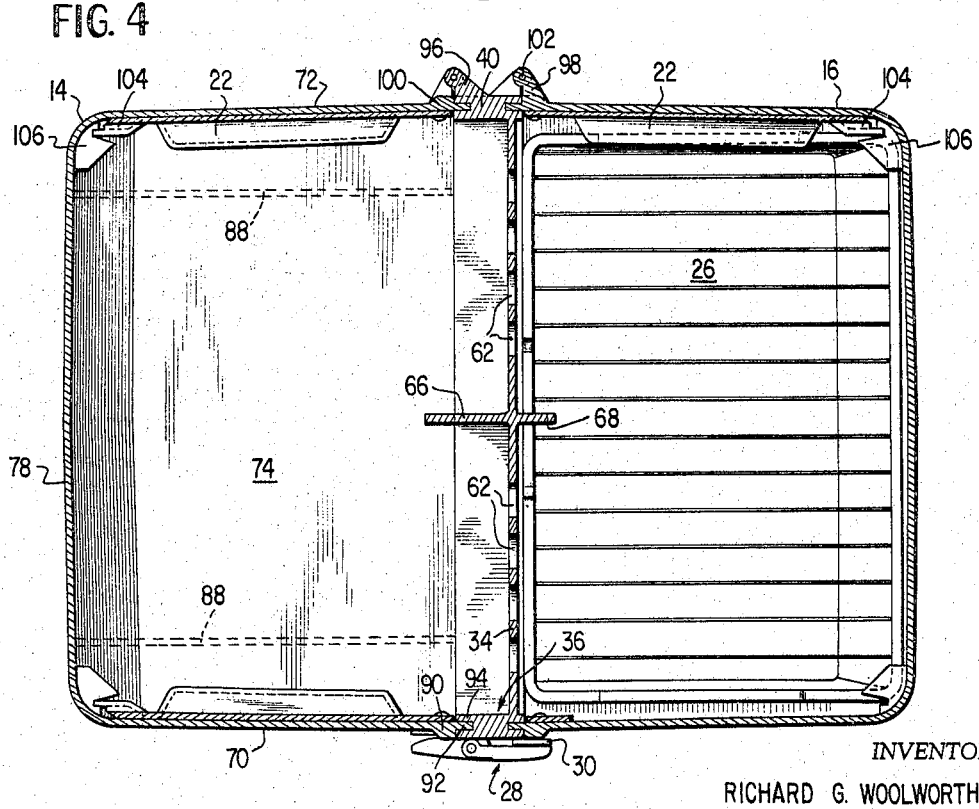
FIGURE 4 is a sectional view of the fishing tackle box, taken along the line 4—4 of FIGURE 3.
Figure 3:
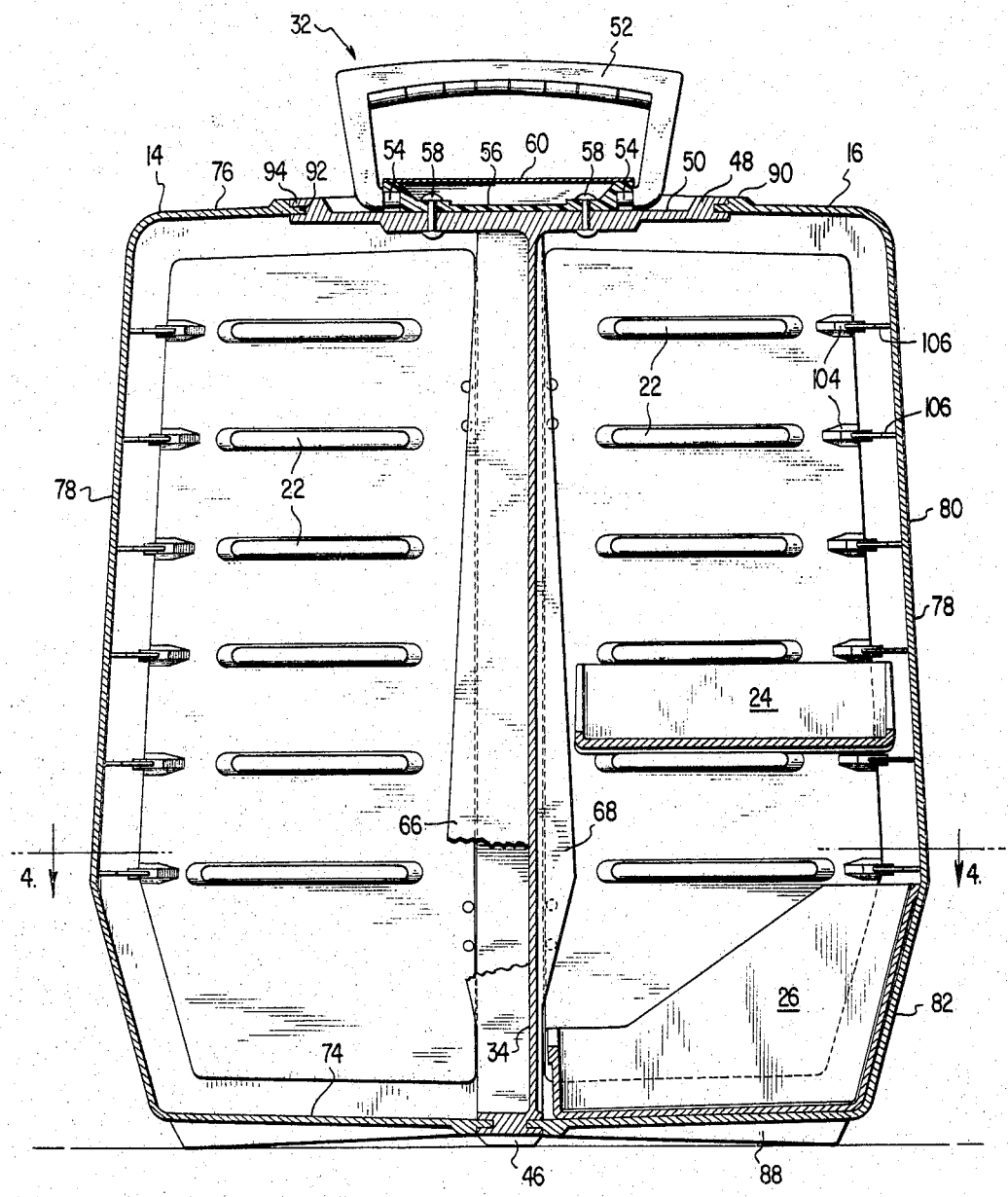
FIGURE 3 is an enlarged sectional view of the fishing tackle box taken along the line 3—3 of FIGURE 2.

Now referring in more detail to the center panel member 12, it can be seen that such member comprises a substantially planar web portion 34 having a flange portion 36 extending around the periphery and at right angles to the plane thereof. Flange portion 36 overhangs both faces of web portion 34, although, as can be seen in FIGURES 3 and 4, it is offset somewhat to one side of web portion 34. Flange portion 36 includes front, rear, bottom and top flange portions 38, 40, 42, and 44, respectively. Foot member 46 is provided on the outer surface of bottom flange portion 42, toward the front thereof, in order to provide a stable support for center panel member 12 when the fishing tackle box is in the fully opened position, and thereby prevent the possibility of the fishing tackle box tipping over.

Top flange portion 44 contains an enlarged central portion 48 which, in the preferred embodiment, is generally hexangular and can be slightly recessed inwardly of the peripihery as at 50. Attention is drawn to FIGURE 3 wherein it can be seen that handle 32 includes a handle means 52 whose ends 54 are inserted into recesses in the ends of the base member 56 which in turn is securely fastened to central portion 48, at a central location thereof, by conventional means, such as screws or rivets 58. Handle member 52 and base member 56 are advantageously made of a plastic material although any other suitable material could be used. A decorative cover plate 60 is clamped over, or frictionally engaged with base member 56. Cover plate 60 may also be fabricated of any suitable material, such as sheet aluminum.

Returning to FIGURE 1, attention is now drawn to the plurality of oval holes 62 appearing in the web 34 and the elastomeric band connecting holes and members 64 also appearing thereon. A fisherman can utilize this area for storing lures, flies, hooks, generally shown as a fly 65, or any number of other small items by placing them against the web 34 or, preferably, in the oval holes 62 and holding them in place with elastomeric bands, preferably made of rubber 67, hooked over the elastomeric band connecting members 64. Centrally located longitudinal reinforcing ribs 66 and 68 perform a dual purpose. They add structural reinforcement to the web 34 while at the same time affording a certain amount of protection to whatever small, delicate items the fisherman chooses to store in the center panel member 12. Further, they serve to hold the trays 24, drawers 26, lure boxes, and the like in place.

Unless otherwise noted, the central member 12, and the cover members 14 and 16 and other components of the fishing tackle box 10 of this invention are preferably constructed of plastic or any other suitable material and preferably have a smooth finish on all interior surfaces. The external surfaces of the center panel member 12 and the cover sections 14 and 16 are preferably finished with a simulated leather grain to provide an attractive appearance, but it should be understood that this invention is not limited thereto.

Cover sections 14 and 16 may take different configurations, although in this preferred embodiment, they are of identical construction. Each of the cover members 14 and 16 includes two sides 70 and 72, a bottom 74, a top 76, and a rear wall 78, with the front being open so that it will close upon the center panel member 12. Referring to FIGURE 3, it can be seen that rear wall 78 preferably has an upper portion 80 which slopes downwardly and outwardly and a lower portion 82 which slopes upwardly and outwardly, the relationship of the angles of slope of upper portion 80 and lower portion 82 being such that they meet at the lower region of the tackle box 10. It should be apparent that for the purpose of this description, the relative positions of these portions 80 and 82 of rear wall 78 are considered in relation to the vertical axis when the tackle box 10 is in the upright position shown in FIGURE 3. Side walls 70 and 72 have a rear edge portion 84 conforming to the configuration of rear wall 78, and a substantially vertically linear front edge portion 86. Side walls 70 and 72 extend substantially normally inwardly from rear wall 78. Bottom member 74 is essentially rectangular in shape and extends inwardly from rear wall 78. Bottom member 74 could extend normally from rear wall 78 but, preferably, slopes slightly downwardly and inwardly from rear wall 78 and can, therefore, be molded. Supporting legs 88 are, accordingly, provided on the outside surface of bottom member 74. Supporting legs 88 on the cover members 14 and 16, in conjuction with foot 46 on the center panel member 12, provide exceptional stability for the fishing tackle box 10 in accordance with this invention when it is in either the open or the closed position, regardless of the surface on which the tackle box is placed. Top member 76 extends substantially normally inwardly and slightly upwardly from rear wall 78, and includes cutaway portion 90 at its front edge portion conforming in configuration to the enlarged central portion 48 of top flange member 44 of center panel member 12.

Figure 2:
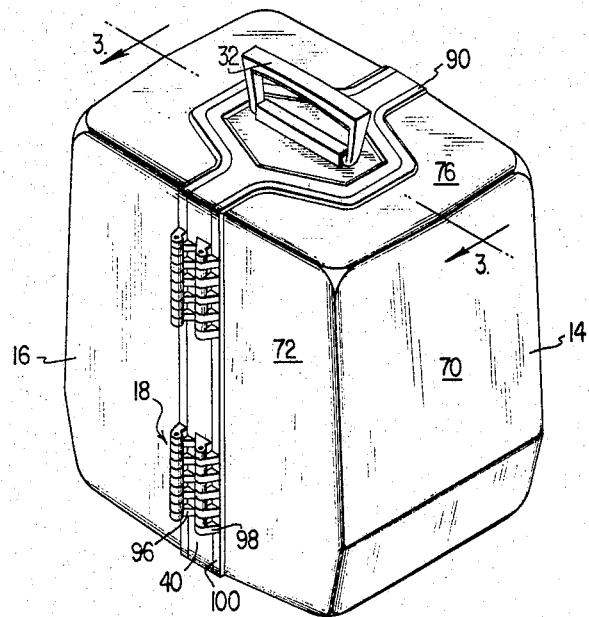
FIGURE 2 is a rear perspective view of the fishing tackle box shown in FIGURE 1, in the closed position.

Peripheral element 90, with its associated tongue portion 92 is provided at the forward edge portions of the sides, bottom and top 70, 72, 74 and 76, respectively, forming the periphery of the open front side of the cover members 14 and 16. Tongue 92 snugly engages corresponding groove 94 in flange portion 36 of the center panel member 12, thereby providing a substantially tight joint seal when the tackle box is in the closed position. The tongue and groove closing relationship, along with the enlarged central portion 48 and the placement of the handle 32, provides great strength for efficiently supporting the weight of the tackle box and its contents. Cover members 14 and 16 are mounted on center panel member 12 by hinge means 18. Referring now to FIGURES 2 and 4, it can be seen that hinge means 18 include a plurality of spaced apart upstanding bosses 96 formed integrally with flange member 40 and a plurality of spaced apart upstanding bosses 98 similarly formed integrally with forward peripheral edge portion 100 on side wall 72. Bosses 96 and 98 are spaced such that they will interfit when cover members 14 and 16 are juxtaposed with center panel member 12. The bosses 96 and 98 contain central apertures 102 which are aligned to allow the placement of a hinge pin or the like. When the cover members 14 and 16 are closed upon center panel member 12, latch 28 overlies and operatively engages strike plate 30 to secure the tackle box in its tight joint closed position.

Panel members 20 contain locking members 104 protruding rearwardly therefrom and located in a spaced-apart relationship such that the upper surface of each locking member 104 is on a horizontal plane with the upper surface of the corresponding elongated guide 22. Cooperating locking members 106 are located at the juncture of rear wall 78 and side walls 70, 72 in the same spaced-apart relationship as locking members 104. The fishing tackle box 10 may be used without panel members 20 or it may be used with insert members 20 placed therein such that locking members 104 engage cooperating locking members 106 to thereby hold panel members 20 in place. The angle of lead between the two mating surfaces of locking members 104 and 106 is such that insert members 20 are held tightly against the inner surface of walls 70 and 72. When the trays 24, conventional lure boxes or other suitable plastic containers are used, they are slidingly inserted onto the guides 22 and in their fully inserted position, they rest on the upper surfaces of guides 22 and locking members 104 and 106. The drawer 26 are inserted on the floor or bottom member 74 with the lowermost guide 22 serving to provide some support. When the tackle box 10 is in the closed position, the trays and the like are securely held in place by the center panel member 12.

It will now be apparent from the foregoing detailed description that the objects set forth at the outset of this specification have been successfully achieved through utilization of the present invention.

What is claimed is:
1. A fishing tackle box comprising:
  (a) a pair of box-like cover members, each having a rear wall, two side walls, a bottom wall, a top wall and an open front, each of said side walls, bottom wall and top wall having a front and a rear edge portion;
  (b) a center panel member having a substantially planar web portion and a peripheral flange portion extending beyond both faces of said web portion;
  (c) said flange portion having lower, upper, front and rear flange portions, at least a portion of said upper flange portion extending a greater distance outwardly from both said faces to form an enlarged central upper flange portion;
  (d) handle means secured to said central upper flange portion;
  (e) a portion of the top wall of each of said cover members having a cutout in its front edge conforming in configuration to the said enlarged central upper flange portion;
  (f) hinge means pivotally connecting each of said cover members to said center panel member such that when said cover members are in a first closed position, said front edge portions of said walls abut said flange portions of said center panel member, and when said cover members are in a second open position, access may be had to their interiors through said open sides; and
  (g) latch means for securing said cover sections in said first position.

2. A fishing tackle box as defined in claim 1 wherein said web portion contains a longitudinally extending rib on each side thereof and a plurality of means for mounting fishing lures, flies and the like thereon.

3. A fishing tackle box as defined in claim 1 wherein said front edge portions of said walls define tthe periphery of said open front and said periphery contains a forwardly extending tongue thereon, and said peripheral flange portion contains a groove thereon, such that when said cover members are in said first position said tongue is inserted into said groove thereby effecting a tight seal.

4. A fishing tackle box as defined in claim 1 wherein said bottom walls slope forwardly and downwardly from said rear wall, further comprising leg means on the outer face of each of said bottom walls, and a foot means on said lower flange portion, said leg means and said foot means serving to support said tackle box in a substantially stable position.

5. A fishing tackle box as defined in claim 1, further comprising:
  (a) removably mounted tray support means on the inside surface of said side walls;
  (b) locking means for securing said tray support means in said cover members; and
  (c) at least one tray means slideably supported by said tray support means.

6. A fishing tackle box as defined in claim 5 wherein said tray support means each includes a planar insert member containing a plurality of spaced apart transversely extending flat elongated guides upon which said trays slideably rest.

7. A fishing tackle box as defined in claim 1 wherein said enlarged central upper flange portion is substantially hexagonal in shape.

References Cited
UNITED STATES PATENTS

| | | | |
|---|---|---|---|
| 1,577,566 | 3/1926 | Cryder | 43—57.5 |
| 2,558,124 | 6/1951 | Burden | 43—57.5 |
| 2,608,459 | 8/1952 | Malmquist | 312—200 X |
| 2,843,442 | 7/1958 | Hamm | 312—200 X |
| 2,899,256 | 8/1959 | Kelley | 312—296 |
| 2,948,080 | 8/1960 | Hawley | 43—57.5 |
| 3,310,905 | 3/1967 | Davis et al. | 43—57.5 |

SAMUEL KOREN, Primary Examiner

D. J. LEACH, Assistant Examiner

U.S. Cl. X.R.

312—200, 244, 296